United States Patent
Sultan et al.

(10) Patent No.: US 9,331,908 B2
(45) Date of Patent: *May 3, 2016

(54) SPECIFYING PRIORITY ON A VIRTUAL STATION INTERFACE DISCOVERY AND CONFIGURATION PROTOCOL RESPONSE

(71) Applicant: Futurewei Technologies, Inc., Plano, TX (US)

(72) Inventors: Robert Sultan, Somers, NY (US); Yingjie Gu, Nanjing (CN); Yizhou Li, Nanjing (CN); T. Benjamin Mack-Crane, Downers Grove, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/587,933

(22) Filed: Dec. 31, 2014

(65) Prior Publication Data

US 2015/0109964 A1  Apr. 23, 2015

Related U.S. Application Data

(63) Continuation of application No. 13/229,374, filed on Sep. 9, 2011, now Pat. No. 8,953,621.

(60) Provisional application No. 61/381,808, filed on Sep. 10, 2010, provisional application No. 61/430,837, filed on Jan. 7, 2011.

(51) Int. Cl.
  *H04L 12/26* (2006.01)
  *H04L 12/24* (2006.01)
  (Continued)

(52) U.S. Cl.
  CPC ........ *H04L 41/0853* (2013.01); *G06F 9/45558* (2013.01); *H04L 12/4645* (2013.01); *H04L 41/12* (2013.01); *H04L 12/4641* (2013.01); *H04L 12/4675* (2013.01)

(58) Field of Classification Search
  None
  See application file for complete search history.

(56) References Cited

U.S. PATENT DOCUMENTS

| 7,385,973 | B1 | 6/2008 | Johnson et al. |
| 7,466,698 | B2 | 12/2008 | Ishwar et al. |

(Continued)

FOREIGN PATENT DOCUMENTS

| CN | 1606849 A | 4/2005 |
| CN | 1852234 A | 10/2006 |

(Continued)

OTHER PUBLICATIONS

Li, Y., et al., "Vlan info in VDP," Powerpoint, Sep. 13, 2010, 13 pages.

(Continued)

*Primary Examiner* — Minh-Trang Nguyen
(74) *Attorney, Agent, or Firm* — Conley Rose, P.C.; Grant Rodolph; William H. Dietrich

(57) ABSTRACT

A method implemented by a network component is provided. The method includes receiving a Virtual Station Interface (VSI) Discovery Protocol (VDP) request from an Edge Virtual Bridging (EVB) station and transmitting, to the EVB station, a VDP Response in response to the request. The VDP Response includes a VDP Type-Length-Value (TLV) having a Filter Information field. The Filter Information field is configured to specify a Priority Code Point (PCP) value associated with one or more Virtual Local Area Network (VLAN) Identifier (VID) values carried by the VDP Response. The PCP value is carried in a PCP field and adopted by the EVB station as a default PCP value associated with the VSI and at least one VID. The Filter Information field further contains a PCP Significant (PS) field associated with each PCP field, and wherein the PS field indicates whether the PCP field carries the PCP value.

19 Claims, 5 Drawing Sheets

(51) Int. Cl.
*G06F 9/455* (2006.01)
*H04L 12/46* (2006.01)

(56) References Cited

U.S. PATENT DOCUMENTS

| | | | |
|---|---|---|---|
| 7,675,890 B2 | 3/2010 | Wang | |
| 7,710,985 B2 | 5/2010 | Nozue et al. | |
| 7,764,688 B2 | 7/2010 | Rabie et al. | |
| 8,149,834 B1 | 4/2012 | Nielsen et al. | |
| 8,194,674 B1 | 6/2012 | Pagel et al. | |
| 8,873,566 B2* | 10/2014 | Sultan et al. | 370/395.42 |
| 8,953,621 B2* | 2/2015 | Sultan et al. | 370/401 |
| 2002/0003801 A1 | 1/2002 | Hwa et al. | |
| 2002/0009084 A1 | 1/2002 | Kalkunte | |
| 2003/0120763 A1 | 6/2003 | Volpano | |
| 2004/0081180 A1 | 4/2004 | De Silva et al. | |
| 2005/0053046 A1 | 3/2005 | Wang | |
| 2005/0084092 A1 | 4/2005 | Rice | |
| 2005/0094567 A1 | 5/2005 | Kannan et al. | |
| 2005/0261970 A1 | 11/2005 | Vucina et al. | |
| 2006/0039390 A1 | 2/2006 | Boyd et al. | |
| 2006/0067335 A1 | 3/2006 | Maya et al. | |
| 2006/0203826 A1 | 9/2006 | Cho et al. | |
| 2006/0274744 A1 | 12/2006 | Nagai et al. | |
| 2007/0097968 A1 | 5/2007 | Du | |
| 2007/0140263 A1 | 6/2007 | Mitome et al. | |
| 2007/0223493 A1 | 9/2007 | Sridhar et al. | |
| 2008/0097858 A1 | 4/2008 | Vucina et al. | |
| 2008/0117902 A1 | 5/2008 | Vinneras | |
| 2008/0137557 A1 | 6/2008 | Nozue et al. | |
| 2008/0199180 A1 | 8/2008 | Yang et al. | |
| 2008/0270588 A1 | 10/2008 | Sultan et al. | |
| 2008/0291928 A1 | 11/2008 | Tadimeti et al. | |
| 2008/0298274 A1 | 12/2008 | Takashige et al. | |
| 2009/0067436 A1 | 3/2009 | Gast et al. | |
| 2009/0122800 A1 | 5/2009 | Umayabashi et al. | |
| 2009/0279558 A1 | 11/2009 | Davis et al. | |
| 2009/0304380 A1 | 12/2009 | Sadananda et al. | |
| 2010/0040060 A1 | 2/2010 | Gleeson | |
| 2010/0054129 A1 | 3/2010 | Kuik et al. | |
| 2010/0054251 A1 | 3/2010 | Lee et al. | |
| 2010/0142537 A1 | 6/2010 | Lee et al. | |
| 2010/0195492 A1 | 8/2010 | Harmatos et al. | |
| 2010/0232443 A1 | 9/2010 | Pandey et al. | |
| 2010/0287262 A1 | 11/2010 | Elzur | |
| 2010/0303083 A1 | 12/2010 | Belanger et al. | |
| 2011/0002346 A1 | 1/2011 | Wu | |
| 2011/0004877 A1 | 1/2011 | Wu | |
| 2011/0029734 A1 | 2/2011 | Pope et al. | |
| 2011/0035747 A1 | 2/2011 | Machida | |
| 2011/0058573 A1 | 3/2011 | Balakavi et al. | |
| 2011/0110266 A1 | 5/2011 | Li et al. | |
| 2011/0122784 A1 | 5/2011 | Ananthanarayanan et al. | |
| 2011/0202485 A1 | 8/2011 | Cutler et al. | |
| 2011/0271277 A1 | 11/2011 | Hussain et al. | |
| 2011/0299414 A1 | 12/2011 | Yu et al. | |
| 2011/0317558 A1 | 12/2011 | Siddam et al. | |
| 2012/0016970 A1 | 1/2012 | Shah et al. | |
| 2012/0155466 A1 | 6/2012 | Davis | |
| 2012/0257496 A1 | 10/2012 | Lattmann et al. | |

FOREIGN PATENT DOCUMENTS

| | | |
|---|---|---|
| CN | 1878133 A | 12/2006 |
| CN | 101064682 A | 10/2007 |
| CN | 101411138 A | 4/2009 |

OTHER PUBLICATIONS

Recto, R., et al., "Ethernet Virtual Bridging Automation Use Cases," IBM, 2010, 10 pages.
Hewlett-Packard, IBM, "EVB Proposal for: Virtual Ethernet Port Aggregator, Edge Virtual Bridging TLV, Edge TLV Transport Protocol, Multichannel, and VSI Discovery Protocol," Version 0, Rev 0.1, Mar. 15, 2010, 62 pages.
Sultan, B., "PCP-in-VDP-RSP," Clause 41/0111-v01, P802.1Qbg/D1.3, IEEE, Local and Metropolitan Area Networks, Feb. 1, 2011, pp. 26-30.
Sharma, R., "Vsi Discovery and Configuration—Working Draft, Definitions, Semantics and State Machines," 802.1QBG Presentation, V00, Mar. 16, 2010, 38 pages.
Kashyap, V., et al., "Automating Virtual Machine Network Profiles," 2010 LINUX Symposium, Jul. 13-16, 2010, pp. 147-154.
Media Access Control (MAC) Bridges and Virtual Bridge Local Area Networks, IEEE Standard for Local and Metropolitan Area Networks, IEEE Computers Society, IEEE Std. 802.1Q-2011, Aug. 31, 2011, 1365 pages.
Virtual Bridged Local Area Networks—Amendment: Bridge Port Extension, IEEE P802.1Qbh/D0.4, Aug. 25, 2010, 104 pages.
Virtual Bridged Local Area Networks—Amendment XX: Edge Virtual Bridging, Draft Standard for Local and Metropolitan Networks, P802.1Qbg/D1.7, IEEE, Aug. 22, 2011, 179 pages.
Virtual Bridged Local Area Networks—Amendment XX: Edge Virtual Bridging, Draft Standard for Local and Metropolitan Networks, P802.1Qbg/D1.3, IEEE, Dec. 20, 2010, 171 pages.
Virtual Bridged Local Area Networks—Amendment XX: Edge Virtual Bridging, Draft Standard for Local and Metropolitan Networks, P802.1Qbg/D1.2, IEEE, Oct. 21, 2010, 83 pages.
Virtual Bridged Local Area Networks—Amendment XX: Edge Virtual Bridging, Draft Standard for Local and Metropolitan Networks, P802.1Qbg/D1.4, IEEE, Mar. 10, 2011, 172 pages.
Virtual Bridged Local Area Networks—Amendment XX: Edge Virtual Bridging, Draft Standard for Local and Metropolitan Networks, P802.1Qbg/D1.5, IEEE, Mar. 31, 2011, 166 pages.
Virtual Bridged Local Area Networks—Amendment XX: Edge Virtual Bridging, Draft Standard for Local and Metropolitan Networks, P802.1Qbg/D1.6, IEEE, Jun. 30, 2011, 206 pages.
Virtual Bridged Local Area Networks, IEEE Standard for Local and Metropolitan Area Networks, IEEE Standard 802.1Q, 2005, 303 pages.
Foreign Communication From a Counterpart Application, European Application No. 11823093.7, European Office Action dated Jul. 21, 2014, 6 pages.
Foreign Communication From a Related Counterpart Application, International Application No. PCT/CN2011/079556, International Search Report dated Dec. 22, 2011, 4 pages.
Foreign Communication From a Counterpart Application, PCT Application PCT/CN2011/079556, Written Opinion dated Dec. 22, 2011 5 pages.
Foreign Communication From a Counterpart Application, European Application No. 11823092.9, Extended European Search Report dated Mar. 28, 2013, 8 pages.
Foreign Communication From a Related Counterpart Application, International Application No. PCT/CN2011/079554, International Search Report dated Dec. 22, 2011, 3 pages.
Foreign Communication From a Counterpart Application, PCT Application PCT/CN2011/079554, Written Opinion dated Dec. 22, 2011, 4 pages.
Foreign Communication From a Counterpart Application, European Application No. 11823093.7, Extended European Search Report dated Apr. 4, 2013, 10 pages.
Foreign Communication of a Counterpart Application, Chinese Application No. 201180024246.7, Chinese Search Report dated Jul. 24, 2014, 2 pages.
Foreign Communication of a Counterpart Application, Chinese Application No. 201180024246.7, Chinese Office Action dated Aug. 5, 2014, 4 pages.
Foreign Communication From a Counterpart Application, Chinese Application No. 201180024266.4, Chinese Office Action dated Aug. 18, 2014, 7 pages.
Foreign Communication From a Counterpart Application, Chinese Application No. 201180024266.4, Chinese Search Report dated Aug. 11, 2014, 2 pages.
Office Action dated Nov. 26, 2012, 32 pages, U.S. Appl. No. 13/630,400, filed Sep. 28, 2012.
Office Action dated Apr. 2, 2013, 35 pages, U.S. Appl. No. 13/630,400, filed Sep. 28, 2012.

(56) References Cited

OTHER PUBLICATIONS

Office Action dated Dec. 7, 2012, 19 pages, U.S. Appl. No. 13/625,573, filed Sep. 24, 2012.
Office Action dated Jun. 3, 2013, 11 pages, U.S. Appl. No. 13/625,573, filed Sep. 24, 2012.
Office Action dated Feb. 21, 2013, 28 pages, U.S. Appl. No. 13/229,163, filed Sep. 9, 2011.
Office Action dated Sep. 5, 2013, 29 pages, U.S. Appl. No. 13/229,163, filed Sep. 9, 2011.
Office Action dated Jun. 14, 2013, 40 pages, U.S. Appl. No. 13/229,374, filed Sep. 9, 2011.
Office Action dated May 13, 2014, 19 pages, U.S. Appl. No. 13/229,374, filed Sep. 9, 2011.
Notice of Allowance dated Oct. 2, 2014, 13 pages, U.S. Appl. No. 13/229,374, filed Sep. 9, 2011.
"Darpa Internet Program Protocol Specification," Internet Protocol, RFC 791, Sep. 1981, 49 pages.

* cited by examiner

SPECIFYING PRIORITY ON A VIRTUAL STATION INTERFACE DISCOVERY AND CONFIGURATION PROTOCOL RESPONSE

CROSS-REFERENCE TO RELATED APPLICATIONS

The present application is a continuation of U.S. patent application Ser. No. 13/229,374 filed Sep. 9, 2011 by Robert Sultan, et al. and entitled "Specifying Priority on a Virtual Station Interface Discovery and Configuration Protocol Response," which claims the benefit of U.S. Provisional Patent Application No. 61/381,808 filed Sep. 10, 2010 by Yizhou Li, et al. and entitled "Method to Pass Virtual Local Area Network Information in Virtual Station Interface Discovery and Configuration Protocol," and U.S. Provisional Patent Application No. 61/430,837 filed Jan. 7, 2011 by Robert Sultan, et al. and entitled "Specifying Priority on a Virtual Server Interface Discovery Protocol Response," all of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks, such as Ethernet based networks, are comprised of nodes that transport data through the network. The nodes may include switches, and/or bridges that transport the individual data frames through the network. For example, the Institute of Electrical and Electronics Engineers (IEEE) 802.1Q compliant Ethernet bridges forward data frames based on a medium access control (MAC) address and virtual local area network identifier (VID) contained in the header of the frame. Frames may be granted priority in forwarding relative to other frames according to the value of a Priority Code Point (PCP) value also contained within the header of the frame.

SUMMARY

In one embodiment, the disclosure includes method implemented by a network component is provided. The method includes receiving a Virtual Station Interface (VSI) Discovery Protocol (VDP) request from an Edge Virtual Bridging (EVB) station and transmitting, to the EVB station, a VDP Response in response to the request. The VDP Response includes a VDP Type-Length-Value (TLV) having a Filter Information field. The Filter Information field is configured to specify a (Priority Code Point) PCP value associated with one or more Virtual Local Area Network (VLAN) Identifier (VID) values carried by the VDP Response. The PCP value is carried in a PCP field and adopted by the EVB station as a default PCP value associated with the VSI and at least one VID. The Filter Information field further contains a PCP Significant (PS) field associated with each PCP field, and wherein the PS field indicates whether the PCP field carries the PCP value.

In another embodiment, the disclosure includes a networking component. The network component includes a transmitter configured to send to an Edge Virtual Bridging (EVB) bridge a virtual station interface (VSI) discovery and configuration protocol (VDP) request, a receiver configured to receive a VDP response from the EVB bridge in response to the VDP request, wherein the VDP response includes a VDP Type-Length-Value (TLV) having a Filter Information field, and the Filter Information field is configured to specify a PCP value associated with one or more Virtual Local Area Network (VLAN) Identifier (VID) values carried by the VDP Response; wherein the PCP value is carried in a PCP field and adopted by the networking component as a default PCP value associated with the VSI and at least one VID, wherein the Filter Information field further contains a PCP Significant (PS) field associated with each PCP field, and wherein the PS field indicates whether the PCP field carries the PCP value, and a logic unit coupled to the transmitter and the receiver, wherein the logic unit is configured to adopt the PCP value as a default PCP value associated with the VSI and at least one VID.

In yet another embodiment, the disclosure includes a method implemented by at least one network component. The method includes sending from a virtual station to an Edge Virtual Bridging (EVB) bridge a virtual station interface (VSI) discovery and configuration protocol (VDP) request that comprises a first Priority Code Point (PCP) field and a first PCP Significant (PS) field, receiving at the virtual station a VDP response from the EVB bridge, wherein the VDP associate response includes a second PCP field and a second PS field set to indicate a default priority value, and adopting the default priority value to a VSI, wherein a plurality of MAC frames transported via the VSI comprise the default priority value.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A data center may comprise a plurality of bridges that are coupled to a plurality of end-stations. The bridges directly attached to end-stations may deploy IEEE standard 802.1Qbg Edge Virtual Bridging (EVB). Such bridges are known as EVB bridges. An EVB bridge is attached to a plurality of EVB stations, with each EVB station containing a plurality of end-stations. End-stations may share channel or physical link connectivity to the EVB Bridge. In such cases, each end-station is said to be connected to the EVB Bridge via a virtual station interface (VSI). IEEE 802.1Qbg EVB defines a VSI Discovery Protocol (VDP) message that may be exchanged by an EVB station and an EVB bridge, carrying information such as <MAC, VID> pair values that can be used to identify traffic associated with a given VSI at the EVB bridge. IEEE standard 802.1 Qbg EVB is published in a draft at http://www.ieee802.org/1/files/private/bg-drafts/d1/802-1qbg-d1-6.pdf, which is incorporated herein by reference. The VDP is described in clause 41 of the draft. VDP supports control communication between an EVB station and an EVB bridge. The protocol supports the transmission of a VDP Associate Request messages from EVB station to EVB bridge, the reception of the VDP Associate Request by the EVB bridge, the transmission of a VDP response from EVB bridge to EVB station, and the reception of the VDP Associate Response by the EVB station. The purpose of VDP is to bind or unbind a VSI and associated properties with a port of the EVB bridge. Disclosed herein is a system and methods for using a VDP Associate Response message to communicate information related to setting the PCP field value for MAC frames transmitted from an EVB station towards a data center network coupled to the EVB station.

Figure 1:
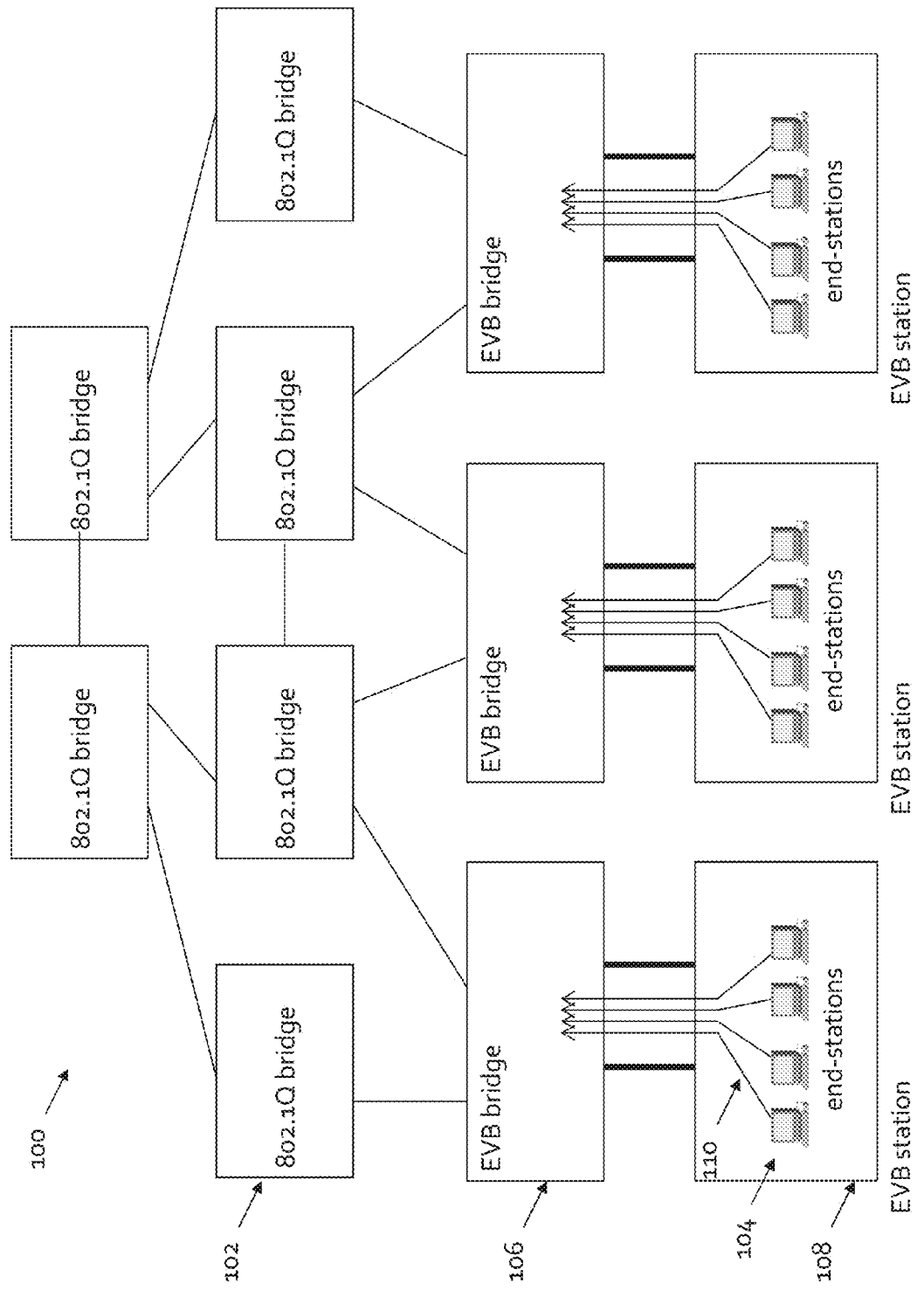
FIG. 1 is a schematic diagram of an embodiment of a data center network.

FIG. 1 illustrates an embodiment of a data center network 100. The data center network 100 may be configured to allow communications between a plurality of attached end-stations 104. The data center network 100 may comprise a plurality of interconnected network bridges 102 conforming, for example to IEEE standard 802.1Q-2011 VLAN Bridging. Bridges at the edge of the data center network 100 may conform to IEEE standard 802.1Qbg EVB and may be known as EVB bridges 106. A plurality of end-stations may conform to IEEE standard 802.1Qbg EVB and may be known as an EVB station 108.

An end-station 104 may communicate data traffic towards the EVB bridge 106 via a VSI 110. An EVB station 108 may exchange control information with the EVB bridge 106 via a VDP, e.g., as described by IEEE standard 802.1Qbg.

In some scenarios, the EVB station may need to determine a PCP value associated with MAC frames to be transmitted on a VSI. In such scenarios, the EVB station and EVB bridge may exchange VDP association (request and response) messages to obtain the PCP value that is to be carried by frames transmitted on the VSI or to obtain information that is used to derive such a value.

Figure 2:
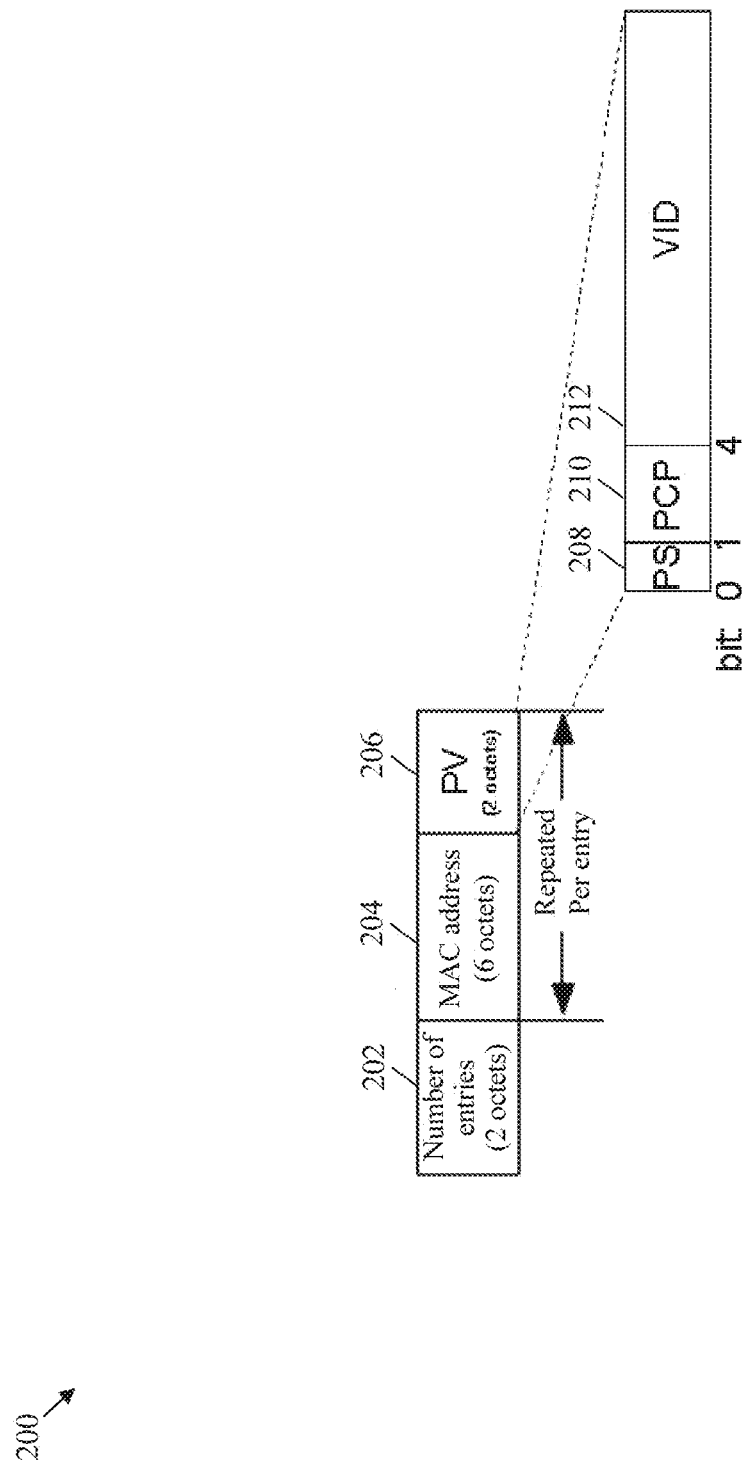
FIG. 2 is a schematic diagram of an embodiment of a VDP TLV.

FIG. 2 illustrates an embodiment of a VDP TLV field 200, which may be used to obtain the PCP value at the EVB station. The VDP TLV 200 may be based on the VDP TLV described in clause 41 of the IEEE 802.1Qbg EVB draft 1.3 and further in subclause 41.1 with some additions or changes, as described below. The VDP TLV may be sent from the EVB bridge to the EVB station, (e.g., in response to a VDP associate request from the EVB station) to communicate a PCP value. The VDP TLV field 200 may correspond to a MAC/VLANs field in the VDP TLV described in clause 41 of the IEEE 802.1Qbg draft 1.3. The VDP TLV field 200 may comprise a number of entries field 202 and a MAC Address field 204. The VDP TLV field 200 may also comprise a PCP/VID (PV) field 206 that may be about two octets long. The PV field 206 may comprise a PCP Significant (PS) field 208 (e.g., of about one bit in size), a PCP field 210 (e.g., of about three bits in size), and a VID field 212 (e.g., of about 12 bits in size). The combination of the PS field 208, PCP field 210, and VID field 212 may also be referred to herein as a Filter Info field, which may have about sixteen bits.

In subclause 41.1 of the IEEE 802.1Qbg draft for EVB, the VDP TLV comprises a VID field of about 16 bits. The high-order four bits of this VID field is reserved. Thus one bit of the reserved high-order four bits may be used for the PS field 208 and the remaining three bits may be used for the PCP field 210. The PS field 208 may be set (e.g., to one) in a response from the EVB bridge to the EVB station to indicate that the PCP field 210 is significant. If the PS field 208 is not set (e.g., equal to zero), then the PCP field 210 is not significant. If the PCP field 210 is significant, then the PCP field 210 in the response may indicate a default priority value for an associated VSI that may be indicated in the VDP associate request/response. The MAC frames sent by the end-station towards the network on that VSI may use the default priority value. The server may use the obtained default PCP field value to determine the PCP value associated with each MAC frame sent on a VSI using an algorithm local to the end-station.

The PCP field 210 may be communicated in the direction from the EVB bridge to the EVB station. As such, the PS field 208 may be set to about zero in a VDP request message from the EVB station to the EVB bridge, and may be set to about one in a VDP message response from the EVB bridge to the EVB station if the corresponding PCP field 210 is significant. The PV field 206 (including the PS field 208, PCP field 210, and VID field 212) may be repeated a plurality of times (for a plurality of VIDs) equal to the value indicated in the number of the number of entries field 202. In the case where a plurality of MAC Address fields 204 and PV fields 206 are repeated in the VDP TLV field 200, the PCP field 210 in the first or last PV field 206 may be used to indicate the default priority value for a VSI (at the EVB station). Alternatively, a plurality of significant PCP fields 210 in the repeated PV fields 206 may indicate default priority values for a plurality of corresponding VID fields 212 in the repeated PV fields 206.

In an embodiment, the PS field 208 and the PCP field 210 may be set independently in each of the repeated PV fields 206. Each PS field 208 and corresponding PCP field 210 may be set according to the following rules:
1. If the PS field 208 is 'set' for an entry, then the PCP field 210 may be applied only to traffic carrying the specified VID.
2. The first entry for which the PS field 208 is 'set' may identify the value of PCP to be applied to all traffic associated with the VSI.
3. The last entry for which the PS field 208 is 'set' may identify the value of PCP to be applied to all traffic associated with the VSI.
4. All entries having the PCP field 208 set may specify the same value of PCP or else an error may be detected.

Additional and/or alternative rules may also be applied to set the PS field 208 and the PCP field 210.

In some embodiments, the PCP field 210 may specify a PCP value that may be carried by the MAC frames from the EVB station on the VSI, or may specify a PCP value that may be carried by the MAC frames on the VSI that are associated with a specified VID value. In other embodiments, the PCP field 210 may specify a value that may be combined and used with other information known to the EVB station to specify the PCP value that may be carried by the MAC frames. For instance, any combination of the following items of information may be combined and used with the PCP field 210 to determine the PCP:

1. The value of the PCP set by the user of the VM associated with the VSI.
2. The identity of the application associated with the MAC frame as can be inferred by the hypervisor of the EVB station by examining, for example, the port number specified at the transport layer (e.g., Transmission Control Protocol (TCP) or User Datagram Protocol (UDP) port number).
3. The priority value specified by the network-layer packet associated with the MAC frame, for example, the IP precedence bits (described in the Internet Engineering Task Force (IETF) Request for Comments (RFC) 791).

Additional and/or alternative items of information may also be combined with the PCP field 210.

In an embodiment, the PCP field 210 may identify a service class (SC). For example, the PCP values of '0', '1', and '2' may represent bronze, silver, and gold service classes, respectively. For instance, the MAC frames associated with an application, e.g., voice, may be assigned a PCP value of '0' if the MAC frames carry voice traffic associated with a VSI that belongs to the bronze SC, a PCP value of '3' if the MAC frames carry voice traffic associated with a VSI that belongs to the silver SC, and a PCP value of '7' if the MAC frames carry voice traffic associated with a VSI that belongs to the gold SC. In an embodiment, the PS field 208 in a VDP request message from the EVB station to the EVB bridge may indicate whether or not the EVB station expects the EVB bridge to provide a significant PCP field 210 and value in a VDP response message.

In some embodiments, the VDP response message may comprise both a PCP value and a SC value. The SC value may be used to compute a second PCP value, which may not be greater than the PCP value specified in the VDP response message. Providing two items of information in the VDP response message may require a different encoding in the VDP response message as described above. For instance, a plurality of fields may be used before the VDP TLV field 200 in the VDP message to provide multiple items of information. The VDP message may comprise a SC Significant (SCS) field (e.g., of about one bit in size), a SC field (e.g., of about eight bits in size), a PCP Significant (PCPS) field (e.g., of about one bit in size), and a PCP field (e.g., of about eight bits in size). The SCS field and SC field may precede the VDP TLV field 200 that comprises PCPS field (PS field 208) and PCP field (PCP field 210). In any of the embodiments above, the network or EVB bridge may use a VSI Type database, also referred to as a port profile database, to maintain one or more PCP values that are communicated from the EVB bridge to the EVB station.

Figure 3:
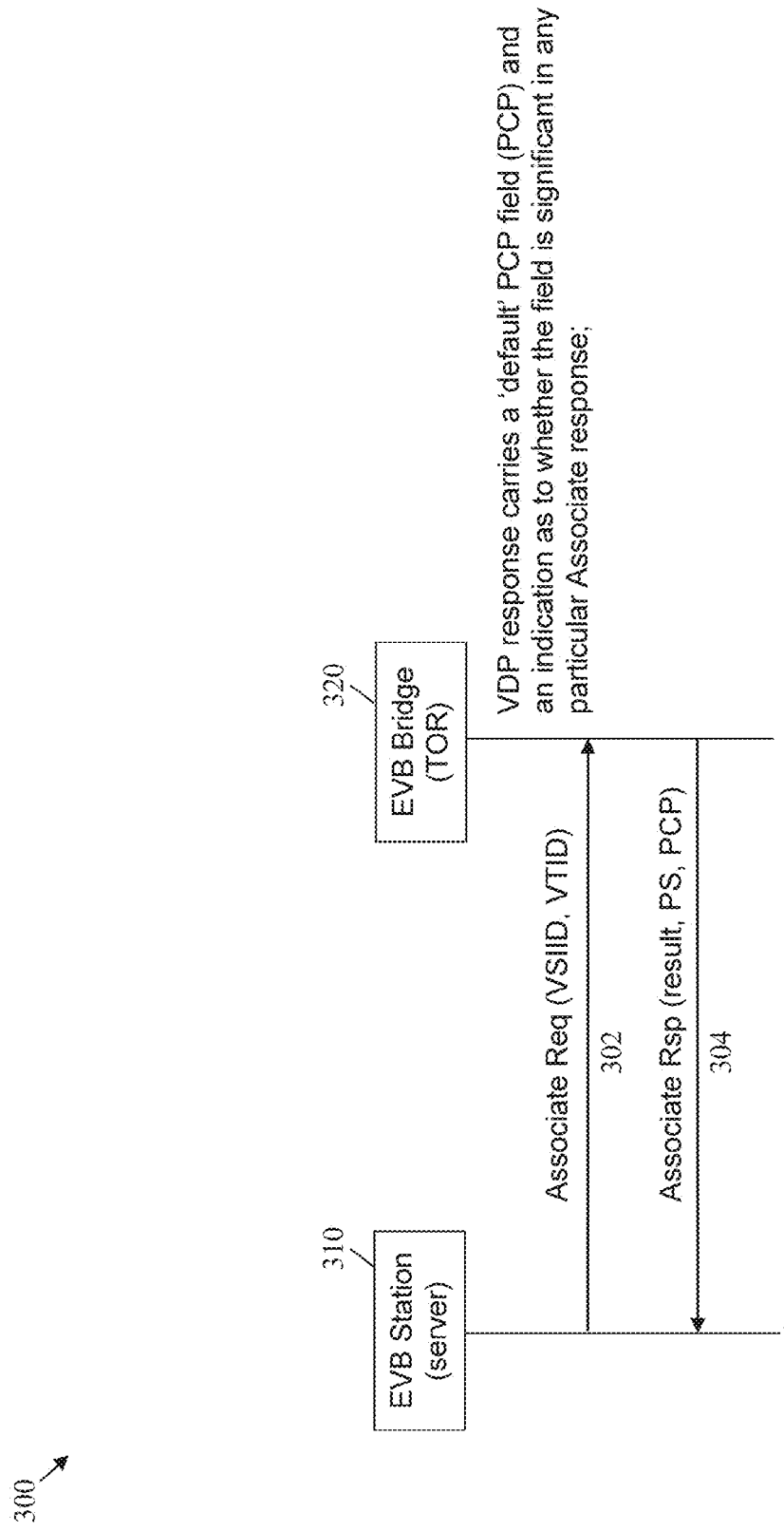
FIG. 3 is a protocol diagram of an embodiment of a method for getting a VDP priority indication.

FIG. 3 illustrates an embodiment of a method 300 for getting a VDP priority indication. The method 300 may allow an EVB station 310 to request from a network via an EVB bridge 320 a priority value for MAC traffic bound to a VSI and allow the EVB bridge 320 to provide the priority value in a response. At step 302, the EVB station 310 may send a VDP Associate Request message to the EVB bridge 320 to obtain a priority value for traffic (MAC frames) transported via a VSI at the EVB station 310. The VDP Associate Request message may comprise VSI Type (VTID) and VSI ID (VSIID) information, such as in a VDP TLV 200. At step 304, the EVB bridge 320 may return a VDP Associate Response message to the EVB station 310 of a priority value, e.g., a PCP and/or SC value, for the indicated VSI and/or VID in the VDP Associate Request message. The VDP Associate Response message may comprise a result that indicates whether the request was successfully met, a PS value (e.g., in a PS field 208), and a PCP value (e.g., in a PCP field 210). The VDP Associate Response message may carry a default PCP value in a PCP field and an indication as to whether the default PCP field is significant and may be used by the EVB station 310.

Figure 4:
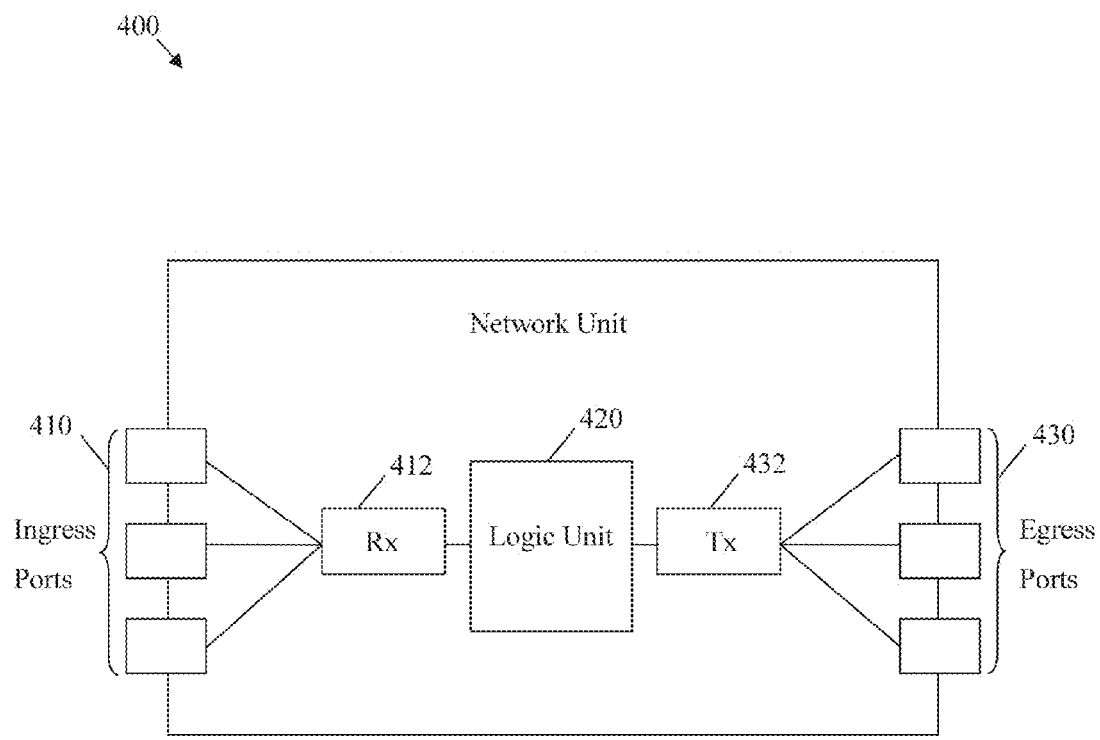
FIG. 4 is a schematic diagram of an embodiment of a network unit.

FIG. 4 illustrates an embodiment of a network unit 400, which may be any device that transports and processes data through a network, e.g., the data center network 100. For instance, the network unit may correspond to or may be located at the EVB station 108 or the EVB bridge 106. The network unit 400 may comprise one or more ingress ports or units 410 coupled to a receiver (Rx) 412 for receiving signals and frames/data from other network components. The network unit 400 may comprise a logic unit 420 to determine which network components to send data to. The logic unit 420 may be implemented using hardware, software, or both. The network unit 400 may also comprise one or more egress ports or units 430 coupled to a transmitter (Tx) 432 for transmitting signals and frames/data to the other network components. The receiver 412, logic unit 420, and transmitter 432 may also implement or support the method 300 above. The components of the network unit 400 may be arranged as shown in FIG. 4.

Figure 5:
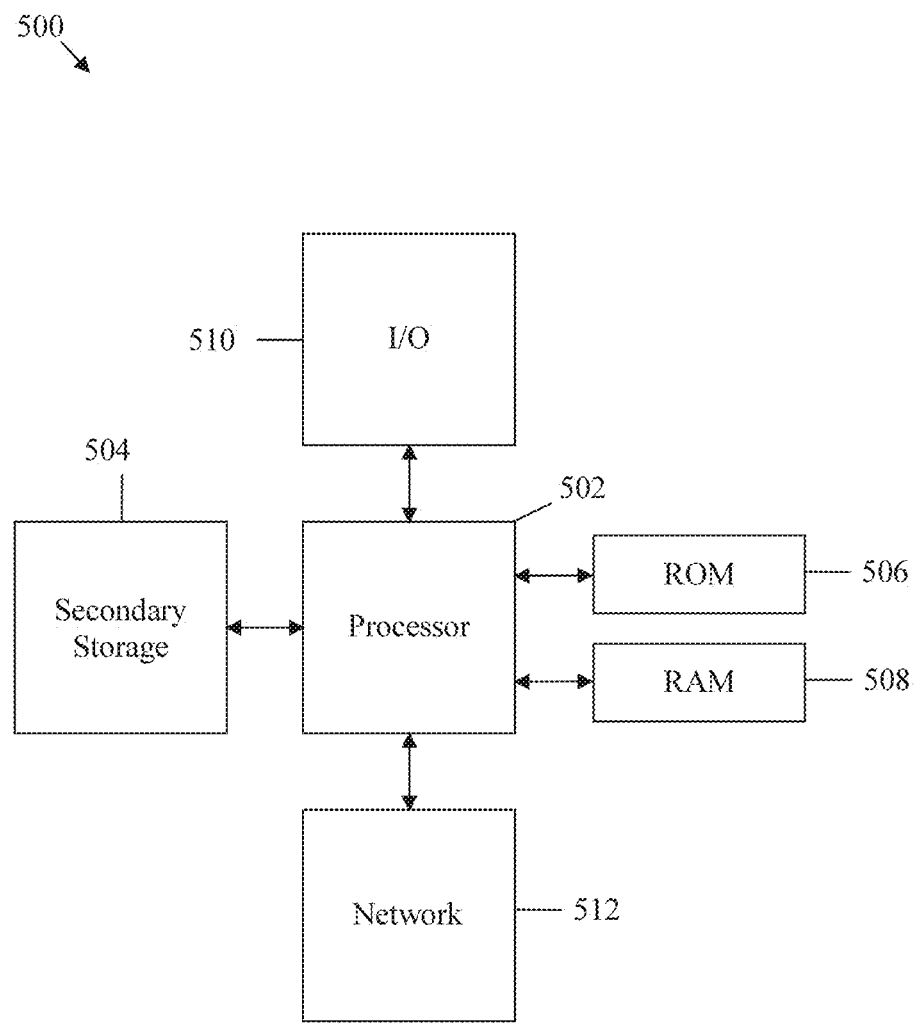
FIG. 5 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, RAM 508, input/output (I/O) devices 510, and network connectivity devices 512. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to second storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 6 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 60 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 60 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network component, comprising:
   receiving a Virtual Station Interface (VSI) Discovery Protocol (VDP) request from an Edge Virtual Bridging (EVB) station;
   transmitting, to the EVB station, a VDP Response in response to the request,
   wherein the VDP Response includes a VDP Type-Length-Value (TLV) having a Filter Information field,
   wherein the Filter Information field is configured to specify a Priority Code Point (PCP) value associated with one or more Virtual Local Area Network (VLAN) Identifier (VID) values carried by the VDP Response;
   wherein the PCP value is carried in a PCP field and adopted by the EVB station as a default PCP value associated with the VSI and at least one VID; and
   wherein the Filter Information field further contains a PCP Significant (PS) field associated with each PCP field, and wherein the PS field indicates whether the PCP field carries the PCP value.

2. The method of claim 1, wherein the PCP value is adopted by the EVB station as the default PCP value when the PCP field carries the PCP value.

3. The method of claim 1, further comprising sending data frames associated with the VSI and the at least one VID to permit the EVB station to determine the PCP value associated with each data frame using an algorithm local to the EVB station.

4. The method of claim 1, further comprising basing the PCP value on an identity of an application associated with a data frame as determined by an examination of higher layer information.

5. The method of claim 3, wherein the PCP field is assigned the default PCP value when the algorithm does not provide a specific PCP value for any given frame.

6. The method of claim 1, wherein the PCP value is three bits in size, wherein the PS field is one bit in size, and wherein the PCP value is specified when the PS field is set.

7. The method of claim 6, wherein the PCP value is used by the EVB station as the default PCP value when the PS field is set.

8. The method of claim 1, wherein the PCP field carries the PCP value when the PS field has a value of one, and wherein the PCP field does not carry the PCP value when the PS field has a value of zero.

9. A networking component comprising:
   a transmitter configured to send to an Edge Virtual Bridging (EVB) bridge a virtual station interface (VSI) discovery and configuration protocol (VDP) request;
   a receiver configured to receive a VDP response from the EVB bridge in response to the VDP request; wherein the VDP response includes a VDP Type-Length-Value (TLV) having a Filter Information field, and the Filter Information field is configured to specify a Priority Code Point (PCP) value associated with one or more Virtual Local Area Network (VLAN) Identifier (VID) values carried by the VDP Response; wherein the PCP value is carried in a PCP field and adopted by the networking component as a default PCP value associated with the VSI and at least one VID, wherein the Filter Information field further contains a PCP Significant (PS) field associated with each PCP field, and wherein the PS field indicates whether the PCP field carries the PCP value; and
   a logic unit coupled to the transmitter and the receiver, wherein the logic unit is configured to adopt the PCP value as a default PCP value associated with the VSI and at least one VID.

10. The networking component of claim 9, wherein the VDP response comprises a VDP Type-Length-Value (TLV) field comprising a PCP/VID (PV) field, and wherein the PV field comprises the PS field, the PCP field, and a VID field.

11. The networking component of claim 10, wherein the PS field comprises about one bit, the PCP field comprises about three bits, and the VID field comprises about 12 bits.

12. The networking component of claim 10, wherein the PCP field provides the PCP value used to determine the default PCP value adopted to the VSI when the PS field is set.

13. The networking component of claim 10, wherein the PCP field specifies the PCP value that is combined and used with other information known to the networking component to specify the default PCP value, and wherein the VDP response is used to associate the VSI to an EVB bridge port.

14. The networking component of claim 13, wherein the PCP value specified by the PCP field is combined with at least one of the following: a value of the PCP set by a virtual machine (VM) user and associated with the VSI, an identity of an application associated with media access control (MAC) frames inferred by a hypervisor of the networking component, and a priority value specified by a network-layer packet associated with the MAC frames.

15. The networking component of claim 10, wherein the PCP field comprises a value that identifies a service class (SC).

16. The networking component of claim 9, wherein the PCP value is a first PCP value, wherein the VDP response comprises both the PCP value and a service class (SC) value used to compute a second PCP value, and wherein the second PCP value is less than the first PCP value.

17. The networking component of claim 9, wherein the VDP response comprises a service class (SC) Significant (SCS) field, a SC field, the PS field, and the PCP field, wherein the SCS field and the SC field provide a SC associated with at least some of a media access control (MAC) frames sent on the VSI.

18. A method implemented by at least one network component, comprising:
sending from a virtual station to an Edge Virtual Bridging (EVB) bridge a virtual station interface (VSI) discovery and configuration protocol (VDP) request that comprises a first Priority Code Point (PCP) field and a first PCP Significant (PS) field;
receiving at the virtual station a VDP response from the EVB bridge in response to the VSI VDP request, wherein the VDP associate response includes a second PCP field and a second PS field set to indicate a default priority value; and
adopting the default priority value to a VSI,
wherein a plurality of media access control (MAC) frames transported via the VSI comprise the default priority value.

19. The method of claim 18, wherein the second PS field is set to one to indicate a significant second PCP field is set to indicate the default priority value, and wherein the first PCP field and the first PS field indicate whether or not the virtual station expects the EVB bridge to supply the significant second PCP field.

* * * * *